United States Patent [19]

Iwasa

[11] Patent Number: 4,658,586
[45] Date of Patent: Apr. 21, 1987

[54] DEVICE FOR CONTROLLING SUPERCHARGING PRESSURE OF EXHAUST GAS TURBOCHARGER

[75] Inventor: Yoshio Iwasa, Nagareyama, Japan

[73] Assignee: Nissan Motor Co., Ltd., Yokohama, Japan

[21] Appl. No.: 703,951

[22] Filed: Feb. 22, 1985

[30] Foreign Application Priority Data

Feb. 24, 1984 [JP] Japan .................................. 59-32677

[51] Int. Cl.[4] ........................................... F02B 37/12
[52] U.S. Cl. ..................................................... 60/602
[58] Field of Search ................. 60/600, 601, 602, 603; 415/144, 145, 151

[56] References Cited

U.S. PATENT DOCUMENTS 2,944,786  7/1960  Angell et al. .
4,177,006  12/1979  Nancarrow ........................ 60/602 X
4,387,571  6/1983  Katsumata et al. .................... 60/602

FOREIGN PATENT DOCUMENTS

18522     2/1983   Japan ....................................... 60/602
1182832   3/1970   United Kingdom .
1554074   10/1979  United Kingdom .
2062116   5/1981   United Kingdom .

Primary Examiner—Michael Koczo
Attorney, Agent, or Firm—Schwartz, Jeffery, Schwaab, Mack, Blumenthal & Evans

[57] ABSTRACT

A supercharging pressure controlling device for an exhaust gas turbocharger having a turbine and a compressor comprises a velocity control device for exhaust gas flow and a bypass valve control device, the bypass valve control device provided into the bypass channel for the turbine to increase the opening when the downstream supercharging pressure of the compressor exceeds a first set value. The velocity control device controls the exhaust gas velocity by varying the degree of valve opening when the downstream supercharging pressure of the compressor exceeds a second set value, wherein the first set value of the supercharging pressure is higher than the second set value.

9 Claims, 5 Drawing Figures

DEVICE FOR CONTROLLING SUPERCHARGING PRESSURE OF EXHAUST GAS TURBOCHARGER

BACKGROUND OF THE INVENTION

1. Field of the Invention

The present invention relates to a device for controlling the supercharging pressure of an exhaust gas turbocharger for an internal combustion engine in which the internal combustion engine is supplied with the intake gas for supercharging by a compressor which is rotated together with an exhaust gas turbine rotated by the energy of the exhaust gas from the internal combustion engine.

2. Description of the Prior Art

It is common knowledge that the internal combustion engine is equipped with an exhaust gas turbocharger to utilize the exhaust gas energy to supercharge intake air to the internal combustion engine, thereby increasing the intake air charging efficiency and therefore the amount of fuel injection, which does greatly attribute to the increase of the engine output.

However, if the supercharging pressure becomes excessive, excessive stress is imposed on the internal combustion engine and on its intake and exhaust gas system with the attendant risk of damage or destruction. Accordingly, many devices have been developed to prevent excessive increase in supercharging pressure.

An example of these prevention devices is a velocity control device for exhaust gas flow as is described in U.S. Pat. No. 2,944,786. In this device, a control valve is provided in the exhaust gas intake port section of the exhaust gas turbocharger to adjust the degree of opening of the control valve, thereby controlling the velocity of the flow of the exhaust gas in the inlet port leading to the exhaust gas turbine so as to prevent an excessive rotation rate in the exhaust gas turbine. Consequently, the turbine is prevented from excessively driving the compressor coupled directly thereto so as not to excessively increase the supercharging pressure while increasing the exhaust gas flow velocity for higher supercharging pressure at light load operation, thereby increasing the output.

Another example is a bypass channel provided to connect the upstream and downstream sides of the exhaust gas turbine, and the bypass channel is provided with a bypass control valve means, which is adapted to open when the supercharging pressure in the bypass channel on the downstream side of the compressor goes above a set value. When the supercharging pressure on the downstream side of the compressor is about to exceed a specified value, the bypass control valve means opens and the energy of the exhaust gas is exhausted to the outside through the bypass channel so that it does not act to rotate the exhaust gas turbine. This prevents excess rotation of the exhaust gas turbine and consequently excessive increase in the supercharging pressure.

The velocity control device for exhaust gas flow and the bypass control valve device can effectively carry out supercharger pressure control, but the following types of inconveniences still remain.

Specifically, in the velocity control device for exhaust gas flow, when the supercharging pressure exceeds the set value, the cross-sectional area of the exhaust gas inlet port is enlarged to decrease the flow velocity of the exhaust gas introduced into the exhaust gas turbine. But the full volume of exhaust gas is all introduced into the exhaust gas turbine and not bypassed, so that when the exhaust gas energy is further increased, the rotational speed of the exhaust gas turbine cannot be controlled and the super-charging pressure is ultimately increased. In other words, a drawback of the velocity control valve is in insufficient flexibility of operation. Specifically, the original design specifications of the exhaust gas turbocharger must ensure that the increase of supercharging pressure is below the allowable value. For this reason, the overall torque characteristics must be set to generally produce low supercharging pressure throughout engine operation including the time that the engine is running under low load. However, this results in that the supercharging pressure is reduced in the low load region as mentioned above, which is a problem area in the case of the exhaust gas turbocharger, thus making it difficult to improve the output characteristics in this operating region.

Now turning to the bypass control valve means, when the supercharging pressure is about to exceed the set value, the exhaust gas is introduced into the bypass channel by the bypass control valve means, and is excluded from the region of rotation of the exhaust gas turbine. It therefore functions as an effective means of preventing an excessive increase in the supercharging pressure. However, the torque characteristics determined by the specifications of the exhaust gas turbocharger are constant, and simply act to cut excessive supercharging pressure, which does not solve the problem of low super charging pressure in the low load region. It should be further noted that with such a bypass control device, immediately after the bypass control valve is opened, the exhaust gas turbine rotates at a relatively excessive speed due to the effect of its inertia, causing insufficient reduction of the supercharging pressure with the production of knocking. The back pressure is precipitously lowered giving rise to the fear that the catalytic device in the exhaust system could be damaged.

In addition, it was found out that when either of these devices is used separately, if operation becomes impossible from a one time breakdown or seizure, the exhaust gas turbine and compressor rotate at an abnormally high rate and the supercharging pressure increases excessively, so that knocking could develop or engine damage could result.

Therefore, these prevention devices as mentioned above must be further improved, and development is still required in the gas intake system for supercharging in order to maintain flow flexibility and pressure variability throughout operation.

SUMMARY OF THE INVENTION

An object of the present invention is to provide a supercharging pressure controlling device having its flow flexibility and pressure variability improved throughout operation.

Another object of the present invention is to provide an supercharging pressure controlling device for improving the output characteristics at the low load operation of an internal combustion engine while preventing an excessively large supercharging pressure throughout operation.

Another object of the present invention is to provide a supercharging pressure controlling device which is capable of suppressing the inconvenience of knocking or engine damage.

Briefly described, these and other objects of the present invention are accomplished by the provision of an improved supercharging pressure controlling device comprising a velocity control device of the exhaust gas flow, a bypass control valve means, and a control means for controlling the velocity control device and the bypass control valve means such that the velocity control device is opened at a predetermined pressure value smaller than that of the bypass control valve means. As a result of this arrangement, the velocity control device is activated before the bypass control valve means is activated, which will first prevent an excessive increase in supercharging pressure. When the supercharging pressure is then about to undergo an excessive increase beyond the supercharging pressure suppression capabilities of the velocity control deivce, the bypass control valve device is activated to prevent this increase from taking place.

BRIEF DESCRIPTION OF THE DRAWINGS

These and other objects, features and advantages of the present invention will become more apparent from the following description of preferred embodiment taken in conjunction with the accompanying drawings, in which.

DESCRIPTION OF THE PREFERRED EMBODIMENT

Following is a description of the preferred embodiment of the present invention, with reference to the drawings.

Figure 1:
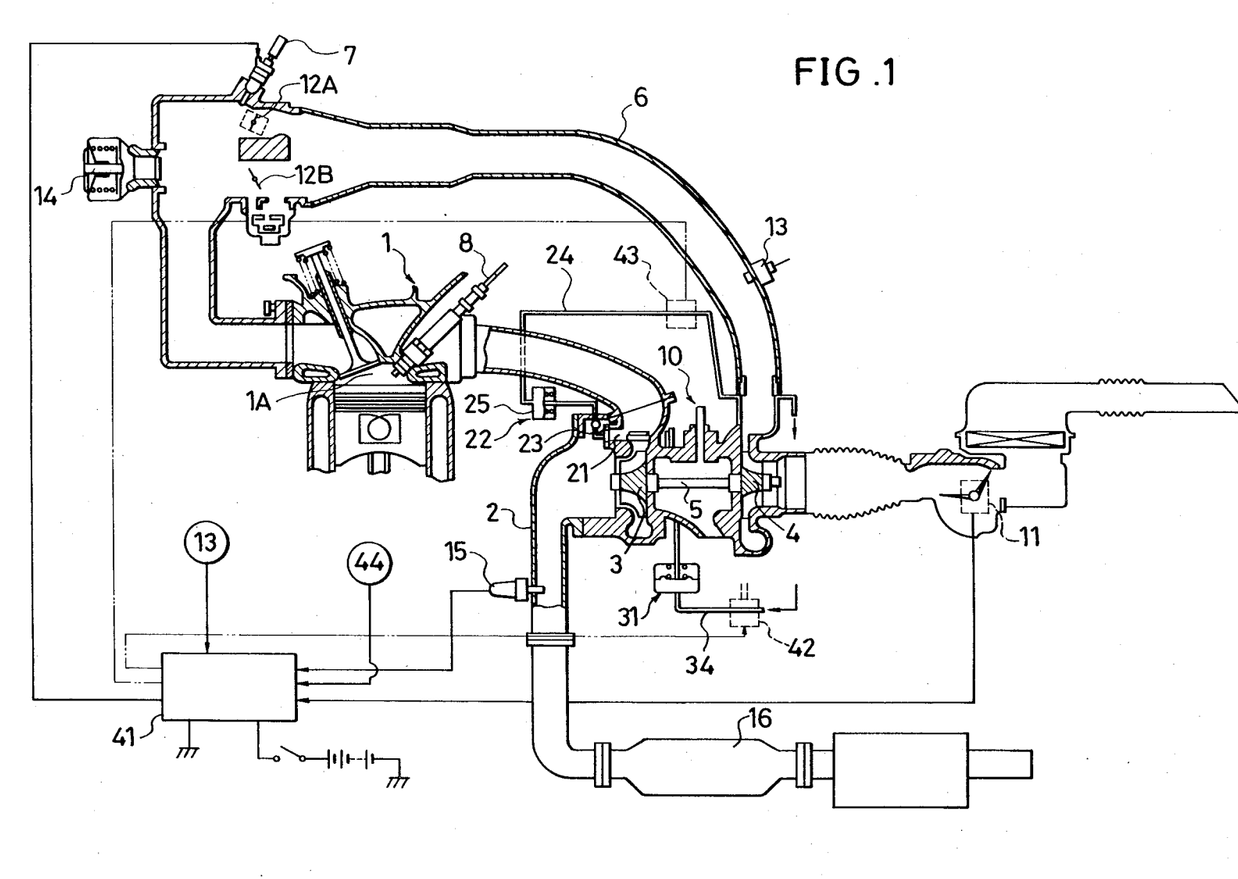
FIG. 1 is a structural drawing of a supercharging pressure controlling device embodying the present invention.

Now referring to FIG. 1, the exhaust gases from the combustion of the fuel in an internal combustion engine drive in a rotating manner an exhaust gas turbine 3 which is positioned in an exhaust gas duct 2, and these gases are then discharged to atmosphere. The exhaust gas turbine 3 is coupled to a compressor 4 through a shaft 5, and the exhaust gas turbine 3, the compressor 4 and the shaft 5 make up the exhaust gas turbocharger 10. The compressor 4 is driven in a rotating manner with the exhaust gas turbine 3. In this arrangement, the intake air compressed (supercharged) by the compressor 4 passes through an intake duct 6 into the internal combustion engine 1 for burning together with the fuel injected from a fuel injection valve 7. Further, an air flowmeter 11 is provided on the upstream side of the compressor 4 in the inlet duct 6. A plurality of intake air throttle valves 12A, 12B are positioned between the compressor 4 and the injection valve 7 to control the volume of intake air. A pressure sensor 13 for detecting the supercharging pressure is provided between the intake air throttle valve 12A and the compressor 4. On the downstream side of the intake air throttle valve 12A, relief valve 14 is provided which opens to relieve excess pressure if the pressure on the downstream side of the intake air throttle valve 12A exceeds the allowable pressure. The pressure at which the relief valve 14 opens is set higher than that at which a bypass control valve device 22 opens, which device 22 will be described later. In addition, an oxygen sensor 15 which detects the oxygen concentration in the exhaust gases, and a catalytic device 16 which eliminates unburned components in the exhaust gases are provided in the exhaust duct 2 on the downstream side of the exhaust gas turbine 3.

In the present invention, the bypass control valve device 22 is provided in a bypass duct 21 which introduces exhaust gas so as to bypass the exhaust gas turbine 3, and a velocity control device 31 for exhaust gas flow is provided at the intake duct of the exhaust gas turbine 3.

Figure 2:
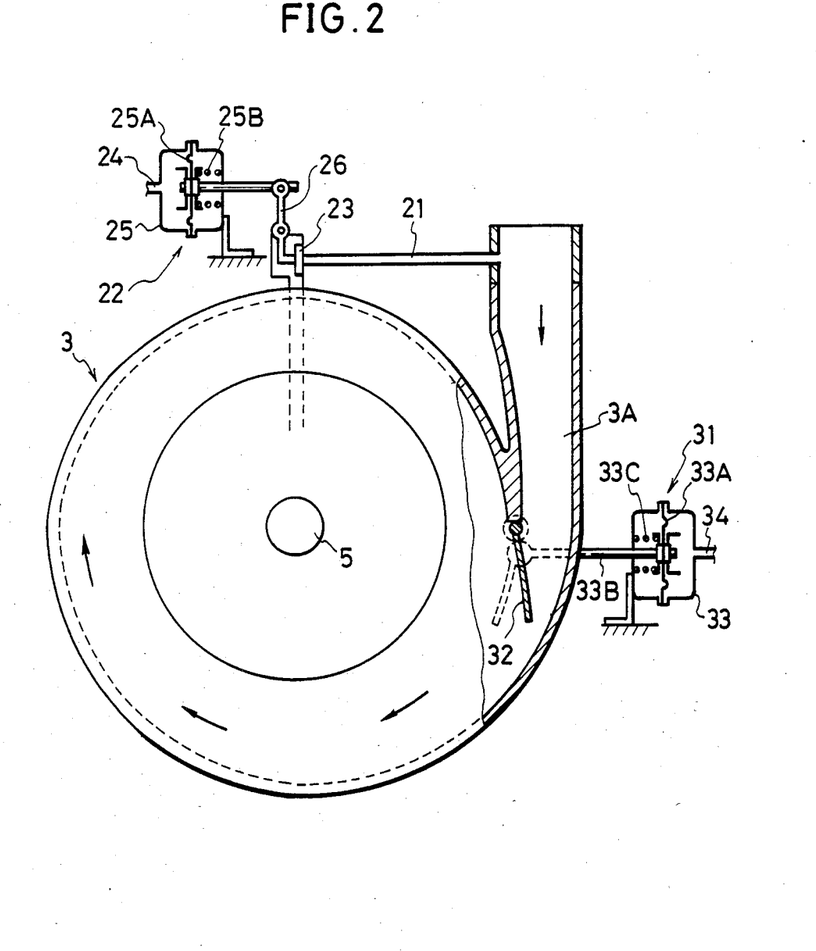
FIG. 2 is a side view of the exhaust gas turbine section of the device shown in FIG. 1.
Figure 3:
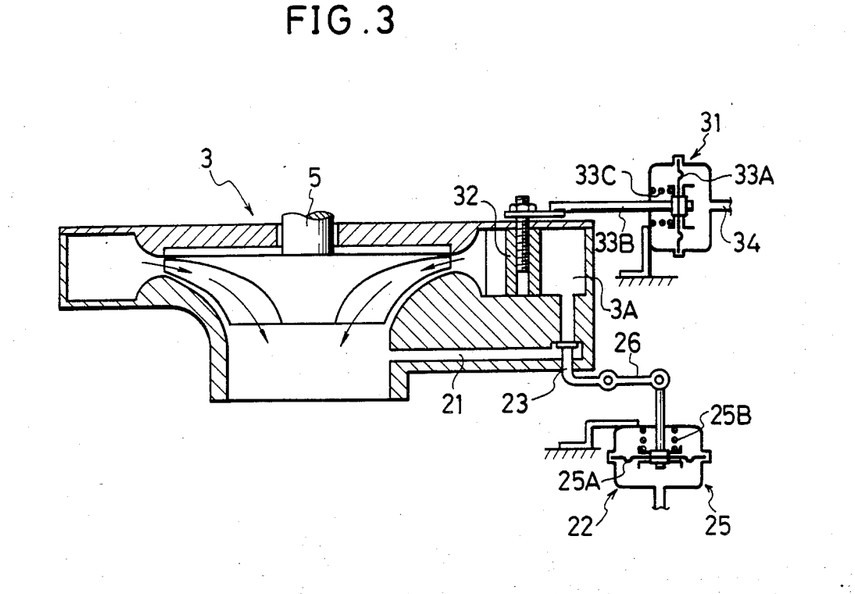
FIG. 3 is a vertical section drawing of the exhaust gas turbine section of the device shown in FIG. 2.
Figure 4:
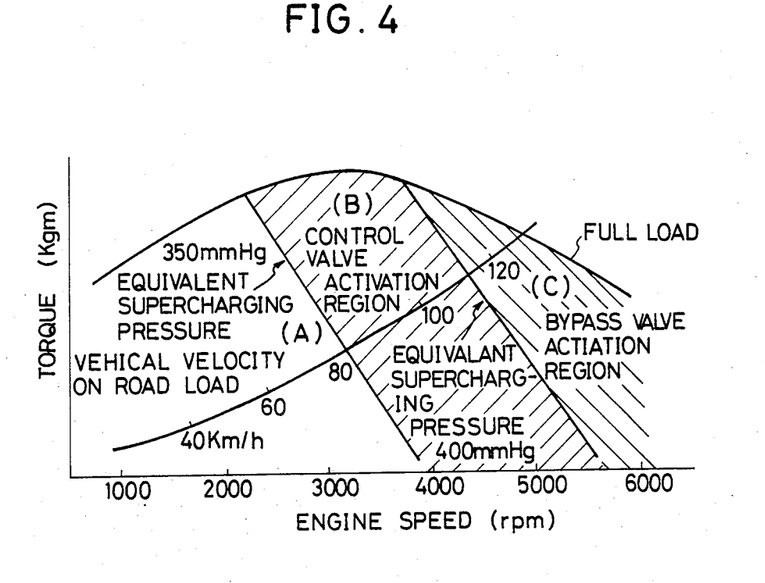
FIG. 4 is a characteristics diagram showing the operating regions of the same embodiment of the present invention.
Figure 5:
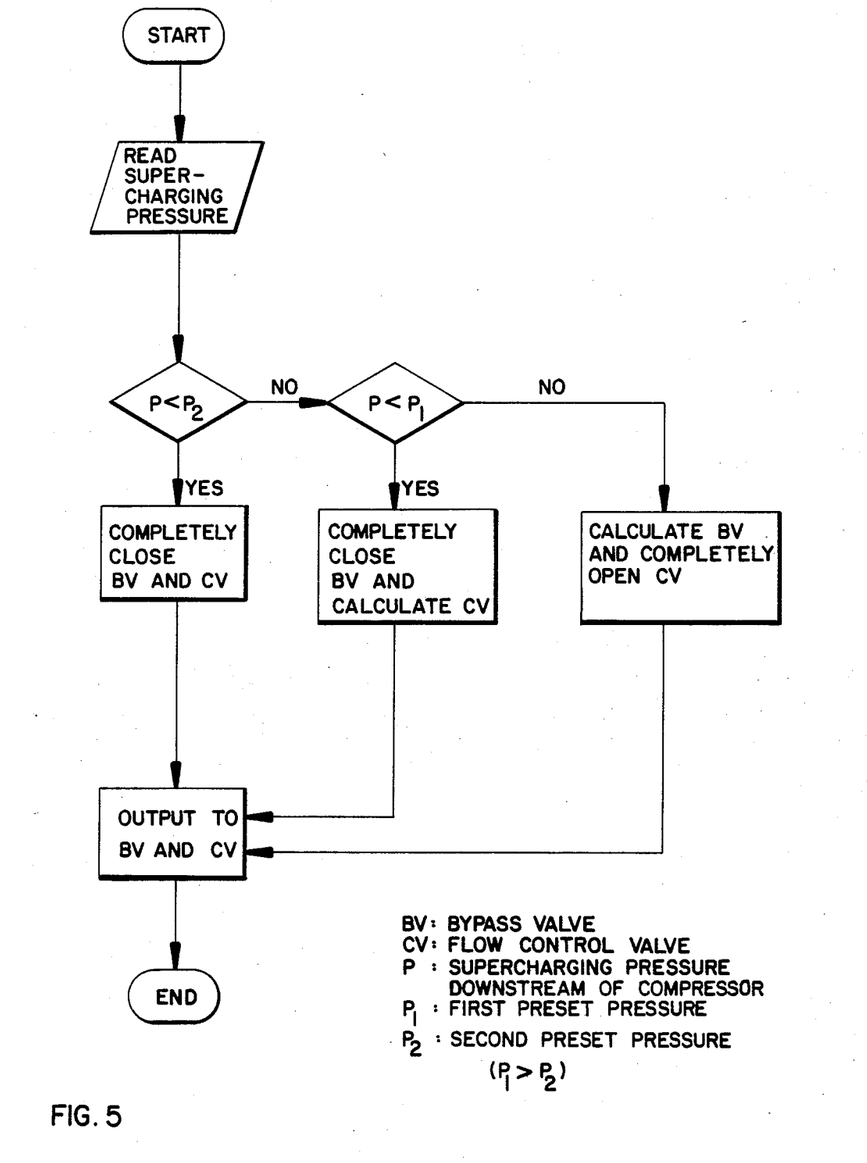
FIG. 5 is a flow chart which explains the operation of the exhaust gas flow control valves.

In the bypass control valve device 22, as shown in FIGS. 1, 2, and 3, a bypass valve 23 for opening and closing the bypass duct 21 is connected through a link 26 with a diaphragm 25A of a diaphragm device 25 into which the supercharging pressure on the upstream side of the intake air throttling valve 12A and on the downstream side of the compressor 4 is introduced through a pressure duct 24, whereby when the supercharging pressure is about to exceed the set point Pb, the diaphragm 25A, in response to the supercharging pressure, opposes the force of a spring 25B in the valve closing direction, and acts to open the bypass valve 23.

Accordingly, in the velocity control device for the exhaust gas flow, the bypass control valve device serves to prevent an excessive rise in the supercharging pressure. This eliminates the problems caused when the supercharging pressure is increased only by the velocity control device as mentioned above with reference to the prior art. Accordingly, the pressure value set for valve opening can be adequately increased to increase the supercharging pressure over the entire operating range. It therefore becomes possible to provide an increase in the supercharging pressure and an improvement in the torque characteristics in the low load range. On the other hand, the velocity control device for exhaust gas flow is activated before the bypass control valve device does, so that the overspeed of the exhaust gas turbine is prevented and the frequency of the action of this bypass control device is minimized. The occasions where relatively excessive rotation of the exhaust gas turbine is caused by inertia at the initial stage of valve opening become infrequent and the inconvenience of knocking or engine damage is suppressed as far as possible.

The velocity control device 31 for exhaust gas flow has a throttle valve 32 provided in the intake port section of the exhaust gas turbine 3, specifically at the exhaust gas scroll intake port section, which is also shown in FIGS. 2 and 3. The throttle valve 32 is pivotally supported at its upstream end on the casing of the intake section of the exhaust gas turbine 3. When the downstream free end of the throttle valve 32 is shifted so that the area of the opening of the intake section 3A is reduced (indicated by the solid lines on the drawing), the exhaust gas flow velocity increases, whereas when the downstream free end is shifted so that the open area of the intake section 3A is increased (indicated by the dashed lines on the drawing), the exhaust gas flow velocity decreases.

The throttle valve 32 is connected to a diaphragm 33A of a diaphragm device 33 by a rod 33B. The supercharging pressure at the upstream side of the intake throttle valve 12A is introduced at the downstream side of the compressor 4 through a pressure duct 34. When this supercharging pressure exceed the set point Pa, the diaphragm 33A, in response to the supercharging pressure, opposes the elastic force of a spring 33C and is displaced in the direction to cause the open area of the intake section 3A of the exhaust turbine to increase, thereby decreasing the flow velocity of the exhaust gas.

The important point here is that the set point Pa at which the velocity control device 31 is opened (e.g. about 350 mm Hg) is smaller than the set point Pb at which the bypass control valve device 22 is opened (e.g. 400 mm Hg).

Next the operation of such a device will be described.

In steady state operation, the intake air is compressed by the compressor 4, subjected to the volume adjustment by the action of the intake throttle valves 12A and 12B, mixed with fuel supplied as a spray from the injection valve 7 to form a mixed gas, which is introduced into a combustion chamber 1A of the internal combustion engine 1. At this point ignition occurs through the activation of a spark plug 8 and combustion takes place. The gases of combustion are discharged into the exhaust duct 2 and their flow velocity is controlled by the velocity control device 31 to rotate the exhaust gas turbine 3 and also the compressor 4 on the same shaft. The exhaust gas is then discharged to atmosphere. Here, because the velocity control device 31 closes the throttle valve 32 to increase the flow velocity of exhaust gas, the driving energy from the exhaust gas turbine 3 is comparatively large, which prevents the reduction of the supercharging pressure in this region.

Here the rotational velocity of the engine increases to discharge the exhaust gases in large volume, the rotation of the exhaust gas turbine 3 increases from the effect of the exhaust gas energy. The compressor 4 also rotates at a high speed so that the supercharging pressure on the downstream side increases.

When this supercharging pressure is increased above the predetermined pressure Pa set to open the velocity control device 31, the supercharging pressure is introduced into the diaphragm device 33 as shown in FIG. 2, and the throttle valve 32 opposes the elastic force of the spring 33C to open the valve. As a result, the throttle valve 32 is relocated from the position indicated by the full lines in FIG. 2 to the position indicated by the broken lines, and the open area of the intake port area 3A increases, reducing the exhaust gas flow velocity. For this reason an increase in the rotational speed of the exhaust gas turbine 3 is restricted and a large intake air supercharging pressure is avoided. In addition, the pressure (back pressure) in the exhaust duct 2 upstream from the exhaust gas turbine 3 simultaneously decreases, whereby the pumping loss of the internal combustion engine 1 decreases to prevent a reduction in output power.

Further, in the case where the internal combustion engine 1 is rotating at high velocity under high load, the volume of exhaust gases discharged from the engine is high. Therefore, even when the velocity control device for exhaust gas flow is in a fully opened state, the total volume of the exhaust gases is used to rotate the exhaust gas turbine 3. This means the rotation of the exhaust gas turbine 3 at high speed, causing the compressor 4 to also rotate at high speed, so that the supercharging pressure rises. At this time, when the supercharging pressure is about to exceed the pressure Pb set to open the bypass control valve device 22, this supercharging pressure is introduced into the diaphragm device 25 to force the diaphragm 25A opposing the eleastic force of the spring 25B, thereby opening the bypass valve 23 connected thereto through the link 26. Consequently, the exhaust gas in the exhaust duct 2 upstream from the exhaust gas turbine 3 is introduced into the downstream side of the turbine 3 through the bypass duct 21. As a result, the high speed rotation of the exhaust gas turbine 3 and the compressor 4 decreases, preventing an excessive supercharging pressure, thus increasing the durability of the shaft 5. In addition, this prevents the development of knocking in the internal combustion engine 1 as well as preventing damage to the body of the engine and its intake and exhaust systems. Thus the supercharging action of the exhaust gas turbocharger can be utilized at a maximum to improve the output characteristics of the engine.

When the engine is operated at an even higher speed and greater load, the capability of the previously discussed function of preventing an increase in the supercharging pressure is exceeded, producing the danger of an even further increase in the supercharging pressure. However, in this case, the bypass control valve acts to prevent such an increase. Accordingly, the exhaust gas turbocharger can therefore be designed so that the supercharging pressure increases across all operating regions with no worry of an inconvenience that the supercharging pressure increases above the pressure Pa for valve opening in the velocity control device 31. Therefore, through an increase in the supercharging pressure in the low load region, it is possible to improve the torque characteristics.

However, in the case where both the bypass control valve device and the velocity control device for exhaust gas flow are set to open at the same value, or in the case where only a bypass control valve device is installed, the exhaust gas turbine, which had been rotating, relatively overspeeds from the effect of inertia immediately after the bypascs control valve opening value is exceeded. Therefore, the response to lowering the supercharging pressure deteriorates, so that knocking can be expected, or the back pressure goes down precipitously, and there is the danger of damage to the catalytic device in the exhaust system. However, with the present invention, the velocity control valve for exhaust gas flow opens before the bypass control valve. Consequently, the frequency of action of the bypass control valve is minimized, and the frequency of occurrence of the abovementioned inconveniences can be reduced. At the same time, the durability of the bypass control valve is increased, and its pressure setting for valve opening is stabilized, making it possible to provide good protection for the engine.

In addition, the intake port of the bypass duct 21 of the bypass control valve device 22 is installed upstream of the throttling valve 32 of the velocity control device 31. Through this configuration, where problems such as breakdown or seizure occur prior to the full opening of the exhaust gas flow velocity control device, the bypass control valve takes care of this extra requirement, and opens. The exhaust gas flows into the bypass duct on the upstream side of the bypass control valve, so that an increase in the supercharging pressure is prevented, and the engine is protected.

In addition, the throttle valve 32 of the velocity control device 31 for exhaust gas flow is subjected to the pulsating pressure of the exhaust gas and can be easily caused to vibrate. To prevent this, the pressurized surface area of the diaphragm 33A is made sufficiently large, and even if the throttling valve 32 is on the point of vibrating from the effect of the pulsations of the exhaust gas pressure, this valve 32 is maintained in a prescribed position by the diaphragm 33A. Incidentally, the velocity control device 31 is adapted to completely open when the bypass control valve opens in the embodiment, but the control range of the velocity control device for exhaust gas flow may overlap with that of the bypass control valve to a degree.

In this embodiment of the present invention, the velocity control device 31 and the bypass control valve device 22 can be controlled by means of a controller 41 which controls the fuel injection amount of the injection valve 7. That is, a three-way solenoid valve 42 is installed in the pressure duct 34 of the exhaust gas flow velocity control device 31, and the same type of three-way solenoid valve 43 is installed in the pressure duct 24 of the bypass control valve device 22. These three-way solenoid valve 42 and 43 dilute with air the gases introduced for supercharge pressure, and introduce the mixture into the diaphragm devices 33 and 25 respectively, wherein the amount of air dilution is varied by changing the current value or the amount of time that power is applied on the basis of a pulse of a prescribed frequency. This controls the amount of valve opening in the velocity control device 31 and the bypass valve control device 22.

In this way, in order to control the three-way solenoid valves 42 and 43, the controller 41, e.g. a microcomputer, receives the following signals—the supercharging output from the output sensor 13; a rotational speed signal (detailed description not given) which is outputted by a rotation sensor 44 used to detect the speed of rotation of the internal combustion engine 1; a signal which is outputted by the air flow meter 11 with reference to intake air flow volume; and a signal which bears a close relationship to the air-fuel ratio, based on an oxygen density signal which is outputted by the oxygen sensor 15. The most appropriate value for the operating status at that time is read out from control objective values previously recorded in memory, and calculations are made of the optimum volume to be injected by the injection valve 7. Command control of the injection valve 7 is then carried out. At the same time, command signals for the optimum degree of opening for the velocity control device 31 and the bypass control valve device 22 are outputted to the three-way solenoid valves 42 and 43. It is therefore possible to electronically feedback-control the supercharging pressure control through the velocity control device 31 for exhaust gas flow and the supercharging pressure through the bypass control device 22.

Various modifications will become possible for those skilled in the art after receiving the teachings of the present disclosure without departing from the scope thereof.

What is claimed is:

1. An internal combustion engine comprising:
    an exhaust gas turbine is driven in a rotating manner by energy of exhaust gas from the internal combustion engine;
    a compressor means, which is driven in a rotating manner by said exhaust gas turbine for supercharging intake air in the internal combustion engine;
    a supercharging pressure controlling means for controlling the supercharged pressure in response to an operating condition of the internal combustion engine;
    an exhaust gas turbocharger comprising:
        a bypass passageway means comprising a valve for permitting exhaust gas to bypass said exhaust gas turbine;
        a bypass valve control means for increasing opening of said valve in said bypass passageway means when a supercharging pressure of said compressor means exceeds a first set value; and
        a velocity control means for decreasing the velocity of exhaust gas entering said exhaust gas turbine when the supercharging pressure of said compressor means exceeds a second set value, wherein the first set value of the supercharging pressure is higher than the second set value.

2. An internal combustion engine as claimed in claim 1, further comprising:
    a pressure sensor means for detecting the supercharging pressure downstream from said compressor.

3. An internal combustion engine as claimed in claim 1, wherein said exhaust gas turbine comprises an intake port for receiving exhaust gas, and wherein said velocity control means comprises a throttle valve means disposed in said intake port for controlling the exhaust gas velocity by varying the degree of valve opening of said throttle valve means.

4. An internal combustion engine as claimed in claim 3, wherein a maximum cross-sectional area of said throttle valve means is large compared to a maximum cross-sectional area of said bypass control valve means.

5. An internal combustion engine as claimed in claim 1, in which said bypass passageway means comprises a bypass channel connected to upstream and downstream sides of said exhaust gas turbine.

6. An internal combustion engine as claimed in claim 5, wherein said bypass channel for said bypass control valve means comprises an inlet port formed further upstream than said velocity control means.

7. An internal combustion engine according to claim 3, wherein said throttle valve means is normally biased in a first direction by a spring means for reducing a cross-sectional area of said exhaust gas turbine intake port; and
    wherein a downstream pressure of said compressor means exerts a pressure on said throttle valve means in a second direction opposite said first direction for increasing a cross-sectional area of said exhaust gas turbine intake port.

8. An internal combustion engine according to claim 1, wherein said bypass valve control means comprises a diaphragm means; and
    wherein a spring means is provided on a first side of said diaphragm means for normally biasing said diaphragm in a closed position and wherein a downstream pressure of said compressor means exerts a force opposite to said normal bias on a second side of said diaphragm;
    whereby said valve is opened when said downstream pressure exceeds said normal bias.

9. An internal combustion engine as claimed in claim 1, wherein each of said bypass passageway means and said velocity control device further comprise a pressure duct for communicating said downstream supercharging pressure, said internal combustion engine further comprising:
    a pair of three-way solenoid valve means, one three-way solenoid valve installed in each of said pressure ducts, having an air introducing means for introducing a predetermined amount of air into said pressure duct for diluting said downstream supercharging pressure in order to control an amount of valve opening; and a controller means for electronically controlling said predetermined amount of air in order to control the amount of valve-opening of said three-way solenoid valve means through feedback control through said pair of three-way solenoid valve means.

* * * * *